ABSTRACT

United States Patent [19]

Benson

[11] 4,348,755
[45] Sep. 7, 1982

[54] SPLIT TUBULAR MEMBER FOR COUPLING A TONEARM TO A SPEAKER CONE
[75] Inventor: John T. Benson, Canoga Park, Calif.
[73] Assignee: Mattel, Inc., Hawthorne, Calif.
[21] Appl. No.: 228,034
[22] Filed: Jan. 23, 1981
[51] Int. Cl.³ .............................................. G11B 3/00
[52] U.S. Cl. ...................................... 369/155; 369/63
[58] Field of Search ............................. 369/63, 65–68, 369/155, 156–158; 181/161, 162

[56] References Cited
U.S. PATENT DOCUMENTS
3,095,201 6/1963 Ryan ....................................... 274/26
3,529,832 9/1970 Goetz et al. ...................... 369/63 X
3,666,274 5/1972 Fox et al. .............................. 274/9 B Primary Examiner—Harry N. Haroian
Attorney, Agent, or Firm—Ronald M. Goldman; Max E. Shirk; Roy A. Ekstrand

[57] ABSTRACT

The piston portion of a coupling for a mechanical phonograph is split lengthwise and joined together at a closed end by a living hinge so that the compression spring which biases the piston against the tonearm will exert a spreading force to the piston conforming it to the inside diameter of the cylinder or collar on the speaker cone, thereby achieving the close clearance required to transmit recorded sound vibrations to the speaker cone.

4 Claims, 4 Drawing Figures

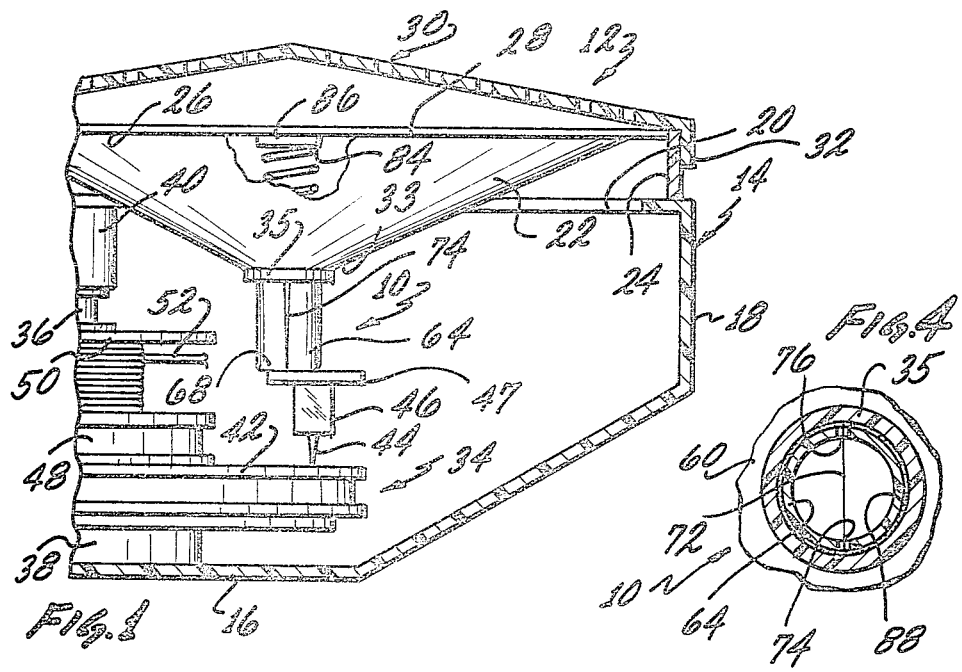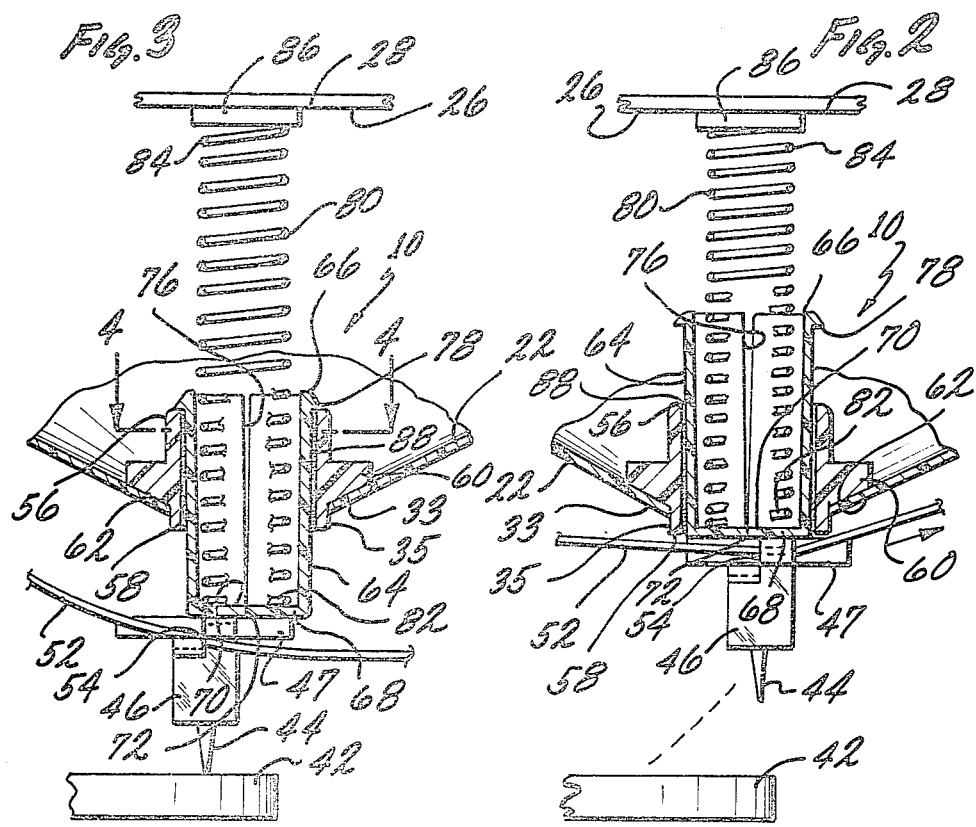

SPLIT TUBULAR MEMBER FOR COUPLING A TONEARM TO A SPEAKER CONE

BACKGROUND OF THE INVENTION

1. Field of the Invention

The present invention relates generally to the field of mechanical phonographs and more particularly to a new and useful split tubular member for couping a tonearm to a speaker cone, whereby vibrations of sonic frequencies will be transmitted from the tonearm to the speaker cone.

2. Brief Description of the Prior Art

Pertinent prior art known to Applicant comprises U.S. Pat. Nos. 3,095,201 and 3,666,274 which disclose mechanical phonographs each including a speaker cone and a tonearm. The tonearm is coupled to the speaker cone by a hollow, cylindrical member or piston reciprocably mounted in a collar encompassed by the apex of the speaker cone. The piston is closed at the end which engages the tonearm; close tolerances and a tight clearance are required between the piston and the collar.

SUMMARY OF THE INVENTION

The present invention is directed, in brief, to the provision of a new and useful split tubular member for coupling a tonearm to a collar on a speaker cone constituting an improvement over coupling members of the type exemplified by U.S. Pat. Nos. 3,095,201 and 3,666,274.

The best mode currently contemplated for carrying out the present invention includes the provision of a tubular member which is closed at one end, split lengthwise along its major axis and hinged by an integral hinge across the closed end. A conventional compression spring, which exerts a force on the tonearm, is assembled to the inside of the tubular member and exerts a spreading force on the tubular member conforming it to the inside diameter of the collar. This spreading feature allows much wider tolerances than those found to be satisfactory in prior art coupling members. It also achieves the close clearance required to transmit vibrations of sonic frequencies from the tonearm to the speaker cone.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which like reference characters refer to like elements in the several views.

BRIEF DESCRIPTION OF THE DRAWING

FIG. 1 is a partial cross-sectional view of a mechanical phonograph employing a coupling member of the present invention;

FIG. 2 is an enlarged, partial cross-sectional view of the phonograph of FIG. 1 showing the relationship of the coupling member, speaker cone and tonearm when the tonearm is in an elevated position;

FIG. 3 is a view similar to FIG. 2 showing the tonearm in a lowered position; and FIG. 4 is a cross-sectional view taken along line 4—4 of FIG. 3.

DESCRIPTION OF THE PREFERRED EMBODIMENT

Referring again to the drawing and more particularly to FIG. 1, a coupling member constituting a presently-preferred embodiment of the invention, generally designated 10, is shown in combination with a mechanical phonograph 12 including a housing 14 having a bottom wall 16, an encompassing sidewall 18 and an open top 20. A reproducing element or speaker cone 22 is supported in open top 20 by a mounting ring 24 having an annular ledge 26 to which the open end 28 of speaker cone 22 is affixed. Open end 28 is preferably covered by a perforated speaker grill 30 having a depending skirt 32 frictionally engaging ring 24. The apex end 33 of speaker cone 22 encompasses a cylinder 35 for slidably receiving coupling member 10.

Phonograph 12 also includes a turntable 34 rotatably mounted in housing 14 by a spindle 36 journalled in a lower boss 38 and an upper boss 40. Turntable 34 carries a phonograph record 42 adapted to be tracked by a stylus or needle 44 carried by the free end of a tonearm 46 having its other end swingably mounted in housing 14 by a suitable post (not shown). Tonearm 46 carries a crossbar 47 which slidably engages coupling member 10 for transmitting vibrations from needle 44 to coupling member 10.

Phonograph 12 also includes a spring motor 48 coupled to spindle 36 for rotating turntable 34. A string spool 50 is also coupled to spindle 36 and carries a plurality of windings of a string 52 which may be withdrawn from spool 50 to reversely rotate spindle 36 and thereby wind spring motor 48. When string 52 is tensioned to wind spring motor 48, tonearm 46 is lifted above record 42, as shown in FIG. 2. This is accomplished by coupling string 52 to tonearm 46 by threading string 52 through an aperture 54 (FIGS. 2 and 3) provided in tonearm 46.

Referring now to FIGS. 2-4, cylinder 35 includes upper and lower ends 56, 58, respectively, and a frustoconical intermediate portion 60 having a lower surface 62 mating with apex end 33 of Cone 22. Cone 22 may be secured to surface 62 by a suitable adhesive, not shown.

Coupling member 10, which may be made of polypropylene, is slidably mounted in cylinder 35 and includes an encompassing sidewall 64, and open top 66 and a bottom wall 68. The upper surface 70 of bottom wall 68 is provided with a living hinge 72 communicating with a front split 74 (FIG. 1) and rear split 76 separating sidewall 64 into two parts connected together by hinge 72. Open top 66 is encompassed by an annular rib 78 adapted to engage cylinder 35 when coupling member 10 is at its lower-most position in cylinder 35.

Coupling member 10 is biased into engagement with crossbar 47 on tonearm 46 by a compression spring 80 having a lower end 82 bearing against bottom wall 68 and an upper end 84 bearing against a bracket 86 affixed to annular ledge 26. Sliding action between coupling member 10 and cylinder 35 may be dampened by a silicone grease 88, if desired.

Operation of coupling member 10 is believed to be apparent from the foregoing and will be briefly summarized at this point. Spring 88 not only applies a suitable pressure to needle 44 for picking up vibrations from the grooves (not shown) on record 42, but also exerts a spreading force to coupling member 10 conforming it to the inside diameter of cylinder 35. This spreading feature allows much wider manufacturing tolerances while achieving the close clearance required to transmit recorded sound vibrations to speaker cone 22.

While the particular coupling member herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than defined in the appended claims, which form a part of this disclosure.

Whenever the term "means" is employed in these claims, this term is to be interpreted as defining the corresponding structure illustrated and described in this specification or the equivalent of the same.

What is claimed is:

1. In combination with a phonograph device including a record, a speaker cone having a collar, a tonearm including a needle, means mounting said tonearm in said phonograph device in a manner such that said needle may move toward and from said record, a tubular member reciprocably mounted in said collar for providing a connection between the tonearm and speaker cone which allows movement of the needle relative to the record without movement of the speaker cone, said tubular member having a closed end, and a compression spring biasing said closed end of said tubular member into engagement with said tonearm, the improvement which comprises:

means for conforming said tubular member to the inside diameter of said collar, said conforming means including means for changing the external configuration of said tubular member.

2. In combination with a phonograph device including a record, a speaker cone having a collar, a tonearm including a needle, means mounting said tonearm in said phonograph device in a manner such that said needle may move toward and from said record, a tubular member reciprocably mounted in said collar for providing a connection between the tonearm and speaker cone which allows movement of the needle relative to the record without movement of the speaker cone, said tubular member having a closed end, and a compression spring biasing said closed end of said tubular member into engagement with said tonearm, the improvement which comprises:

means for conforming said tubular member to the inside diameter of said collar, said conforming means including means for spreading said tubular member apart along its major axis.

3. In combination with a phonograph device including a record, a speaker cone having a collar, a tonearm including a needle and means mounting said tonearm in said phonograph device in a manner such that said needle may move toward and from said record, the improvement which comprises:

a tubular member reciprocably mounted in said collar for coupling said tonearm to said speaker cone, said tubular member having a closed end provided with a hinge and being split lengthwise along its major axis in a manner such that said tubular member may be spread along said hinge for conforming said tubular member to the inside diameter of said collar; and means coupled to said tubular member for spreading said tubular member and for biasing said needle into engagement with said record.

4. An improvement as recited in claim 3 wherein said means coupled to said tubular member comprises a compression spring mounted inside said tubular member with one end engaging said closed end and another end engaging a fixed member in said phonograph device.

* * * * *